Figure 1:
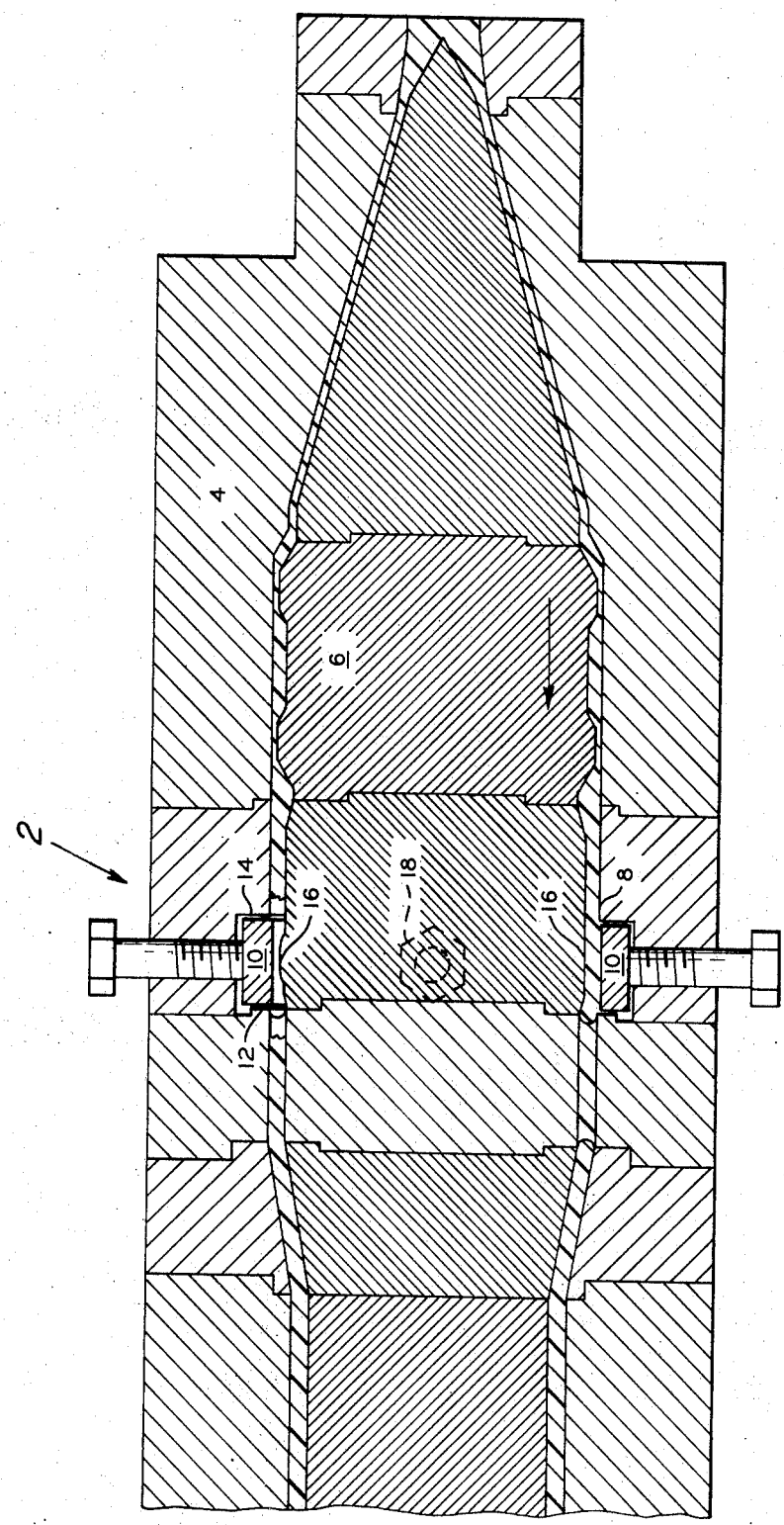

United States Patent [19]
Carrow

[11] 3,761,061
[45] Sept. 25, 1973

[54] APPARATUS FOR ADJUSTING THE FLOW OF MATERIAL THROUGH AN EXTRUDER

[75] Inventor: Guy F. Carrow, Bartlesville, Okla.

[73] Assignee: Phillips Petroleum Company, Bartlesville, Okla.

[22] Filed: Aug. 26, 1971

[21] Appl. No.: 175,195

[52] U.S. Cl. .............................. 259/185, 425/207
[51] Int. Cl. ............................................ B29b 1/06
[58] Field of Search .................... 259/185, 191, 193, 259/9, 10, 4; 118/608, 612; 425/207, 209, 462, 467

[56] References Cited
UNITED STATES PATENTS

| | | | |
|---|---|---|---|
| 2,859,476 | 11/1958 | Lainson | 425/462 |
| 3,024,494 | 3/1962 | Szpila | 425/462 |
| 3,320,635 | 5/1967 | Zolotarevsky | 118/405 |

*Primary Examiner*—John Petrakes
*Assistant Examiner*—Philip R. Coe
*Attorney*—J. Arthur Young et al.

[57] ABSTRACT

An apparatus and method for adjusting the flow of material through the annulus between the churn and a housing assembly of a plasticizing section of an extruder.

3 Claims, 4 Drawing Figures

APPARATUS FOR ADJUSTING THE FLOW OF MATERIAL THROUGH AN EXTRUDER

At high rates of extrusion, particularly where plastic conduit is being extruded by dynamic extruders as known in the art, the churn sometimes is forced out of coaxial alignment with the housing assembly. In such a situation the resultant product is defective.

It is therefore desirable to provide an apparatus for adjusting the flow of material through the annulus between the churn and a housing assembly of the plasticizing section of an extruder for providing a uniform flow of material at all exit segments. Uniform flow through the lands of the die produces a straight product.

Other aspects, objects, and advantages of the present invention will become apparent from a study of the disclosure, the appended claims, and the drawing.

Figure 2:
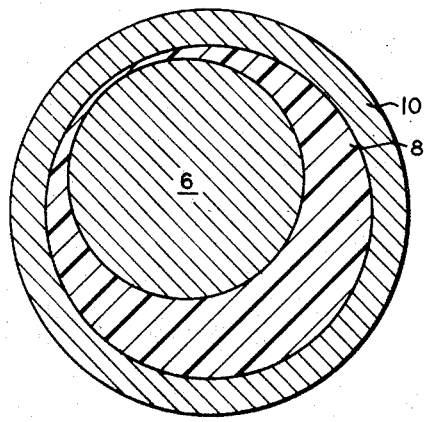
Figure 3:
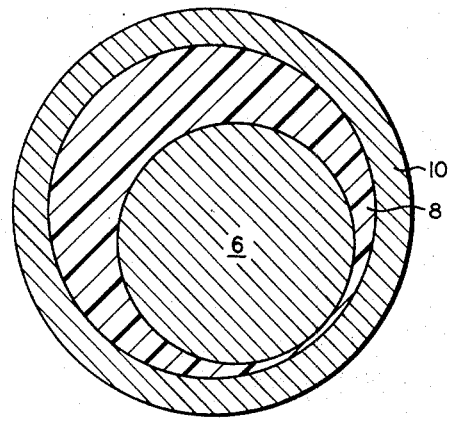
Figure 4:
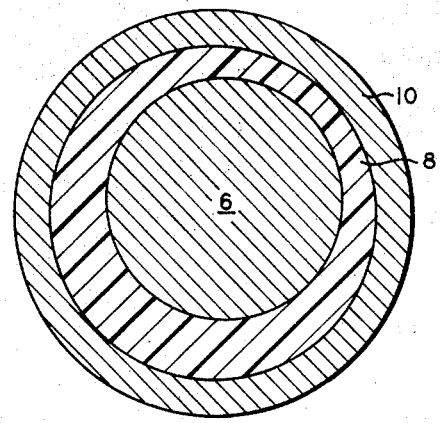

FIG. 1 of the drawing is a diagrammatic view of a plasticizing section of an extruder having the apparatus of this invention contained therein and FIGS. 2–4 are sectional views of the ring 10 positioned at different locations.

Referring to the drawing, the plasticizing section 2 of a dynamic extruder is illustrated. Dynamic extrusion is a process well known in the art wherein a plastic mass is forced by means of a reciprocating piston through a cool zone, then into a heated zone to melt the plastic mass, then to a mixing section or churn and then to a long land die in which the shape takes form and is cooled into a crystalline or near crystalline state prior to leaving the die. Referring to the drawing, the plasticizing section 2 of a dynamic extruder has a housing assembly 4 with a churn 6 positioned therein forming an annulus 8 between the housing assembly 4 and the churn 6. As is known in the art, material passes through the annulus 8 in the direction of the arrow for forming a resultant article. A ring 10 is positioned about the churn 6 within the plasticizing section. This ring 10 has an inside diameter in the range of about the inside diameter of the adjacent portion 12,14 of the housing assembly 4 to substantially the diameter of an adjacent segment 16 of the churn 6 and an outside diameter at least greater than the inside diameter of the housing assembly 4. The ring 10 is positioned about the churn adjacent said churn segment 16. (also see FIGS. 2–4.)

Means are associated with the ring for moving the ring relative to the axis of the churn 6. One example of this moving means is at least three, preferably four, bolts 18 passing through the housing assembly 4 and in contact with threads of the housing assembly 4 and in contact with the ring 10 for movement of the bolts 18 and the ring 10 in response thereto relative to the housing. In order to provide greater adjustment flexibility, it is preferred that the bolts 18 be positioned at equally spaced apart locations about the associated ring 10 and churn 6 and that the ring has an inside diameter substantially equal to the inside diameter of the immediately adjacent portions 12,14 of the housing assembly 2. The ring 10 must be of sufficiently sturdy construction to withstand the high pressures encountered, it is preferred that the ring 10 have a width sufficient for adjustment without undue hangup of the plasticized material. For example, a ring with a 7.925 in. outside diameter, 6.070 in. inside diameter, by 2.000 in. wide was used in an extruder making 2 in. schedule 80 pipe at 180 feet per hour.

In the operation of the apparatus of this invention, a portion of the area of the annulus 8 can be decreased by moving the ring 10 encompassing the churn 6 relative and normal to the axis of the churn 6. By adjusting the position of the ring, any non-coaxial alignment of the churn can be compensated to alter and equalize the pressure drop of the material flowing through the annulus 8 and provide means for altering and maintaining a desirable material flow rate and the product discharging therefrom. By manipulating the bolts 18 relative one to the other, the ring can be moved to a multiplicity of positions relative to the annulus 8. FIGS. 2, 3, and 4 show the ring at different positions. Edge portions of the housing assembly 4 adjacent the ring 10 maintain the ring 10 against movement along the churn 6.

Other modifications and alterations of this invention will become apparent to those skilled in the art from the foregoing discussion and accompanying drawing, and it should be understood that this invention is not to be unduly limited thereto.

1. What is claimed is:

1. An apparatus for adjusting the flow of material through the annulus between a churn and a housing assembly of a plasticizing section of an extruder, comprising:
   a ring being positioned about said churn section within the housing assembly and having an inside diameter in the range of about the inside diameter of adjacent portions of the housing assembly to substantially the diameter of an adjacent segment of the churn and an outside diameter at least greater than the inside diameter of the housing assembly; and
   means for laterally moving the ring relative to the axis of the churn for adjusting the pressure and flow of material about the churn.

2. An apparatus, as set forth in claim 1, wherein the means are at least three bolts with each of said bolts passing through the housing assembly and into contact with the ring, said bolts being matable with threads of the housing assembly for movement of the bolts and ring relative to the housing and the churn.

3. An apparatus, as set forth in claim 1, wherein the inside diameter of the ring is substantially equal to the inside diameter of immediately adjacent portions of the housing assembly.

* * * * *